Jan. 9, 1940. H. FROMM 2,186,671
FRUIT JUICE EXTRACTOR
Filed Jan. 18, 1938
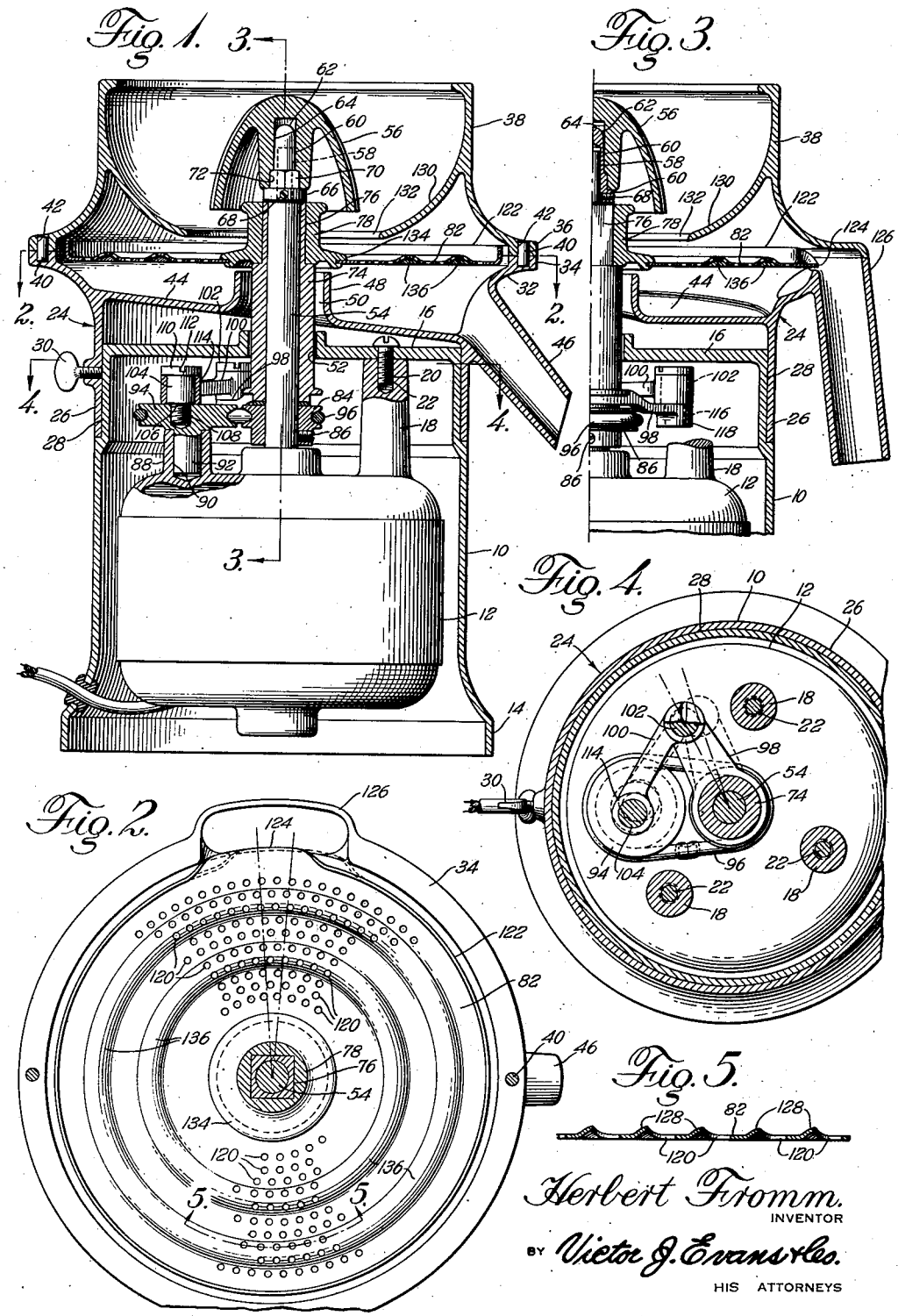
Herbert Fromm
INVENTOR
BY Victor J. Evans & Co.
HIS ATTORNEYS Patented Jan. 9, 1940

2,186,671

UNITED STATES PATENT OFFICE 2,186,671

FRUIT JUICE EXTRACTOR

Herbert Fromm, Hamburg, Wis.

Application January 18, 1938, Serial No. 185,605

5 Claims. (Cl. 146—3)

My invention relates to fruit juice extraction and includes among its objects and advantages the provision of an improved strainer and actuating means therefor.

An object of my invention is to provide a fruit juice extractor embodying certain improvements over the device disclosed in my prior Patent 1,894,858, issued January 17, 1933. In the device disclosed in the above-mentioned patent, I make use of a rotary reamer in combination with a strainer arranged for oscillation about the axis of the reamer and underneath the same. In my prior patent the strainer operates in an efficient manner, but the strainer acts as an accumulator for fruit pulp and fibers so that it is necessary to remove the reamer and the strainer from time to time for removing the accumulation on the latter. In the present invention, I make use of a rotary reamer and an oscillatory strainer, with the strainer so designed as to be self-cleaning, thereby eliminating the necessity of dismantling any of the parts for removing accumulations of fruit pulp and fibers.

Another object is to provide a fruit juice extractor in which the strainer may be oscillated at a high speed and in which the strainer is so designed as to move the fruit pulp and fibers in a spiral path about the axis of the strainer toward its periphery in response to centrifugal forces and in which the strainer is further designed to eject the accumulations thereon as such accumulations collect at its peripheral margin.

A further object is to provide a strainer designed to effectively separate the juices from the solids and in which the strainer is so shaped as to effectively break the solids and juice cells into fine particles whereby a larger volume of juices may be extracted from a given volume of fruit.

Another object is to provide a fruit juice extractor including a rotary reamer and a strainer arranged for oscillation about the axis of the reamer and in which a simple mechanism is connected with the drive shaft of the rotary reamer and the strainer for oscillating the latter.

In the accompanying drawing:

Fig. 1 is an elevational sectional view of my invention;

Fig. 2 is a top plan view;

Fig. 3 is a sectional view along the line 3—3 of Fig. 1; and

Fig. 4 is a sectional view along the line 4—4 of Fig. 1.

In the embodiment selected to illustrate my invention, I make use of a base 10 which may be of tubular construction for housing the motor 12. The base 10 may be flared, as at 14, for ornamental and balancing purposes, and its upper end is provided with a plate 16 from which the motor 12 depends. The motor includes three projections 18 which are arranged in abutting relation with the lower face of the plate 16. Each of the extensions 18 is provided with a threaded bore 20 for the reception of a screw 22 passing through the plate 16 and having threaded relation with the bore 20.

Upon the base 10 I mount a head 24 which includes a flange 26 fitting snugly about the constricted reach 28 of the base 10. Flange 26 carries a set screw 30 to provide a positive connection between the flange 26 and the reach 28, but the head 24 may be removed from the base by merely unloosening the screw and lifting the head away from the base. Head 24 is flared outwardly at 32 for increasing its diameter at the upper end and also to provide a flange 34 upon which the flange 36 of the bowl 38 rests for support. To the flange 34 I fixedly connect two pins 40 which have their upper ends loosely receivable within the bores 42 in the flange 36. These pins prevent lateral displacement of the bowl 38, but the bowl is easily removable by lifting it upwardly in the clear of the pins.

Within the head 24 I provide an inclined plate 44 for conveying the fruit juices to the outlet spout 46. Plate 44 is shaped to provide an upstanding flange 48 which provides an opening 50 aligned with a central opening 52 in the plate 16. The motor 12 is provided with a drive shaft 54 which extends upwardly through the openings 50 and 52 and is connected with the reamer 56 located inside the bowl 38. I reduce the upper end of the shaft 54 to provide a shaft part 58 of small diameter upon which I mount a sleeve 60 having a rounded end 62 which facilitates entrance of the sleeve 60 into the bore 64 in the reamer. Sleeve 60 is provided with a flange 66 which carries a set screw 68 for fixedly connecting the sleeve to the shaft part 58. I provide the sleeve 60 with a square reach 70 which fits snugly wtihin the square opening 72 in the reamer so as to positively connect the reamer with the motor shaft 54 for rotation therewith.

Upon the motor shaft 54 I loosely mount a sleeve 74 which is provided with a square reach 76. A collar 78 is provided with a square opening for snugly receiving the square reach 76, and the lower end of the collar rests upon the ledge 80 on the sleeve 74. My strainer 82 is fixedly connected with the collar 78. Upon the motor shaft 54 I mount a grooved wheel 84. This wheel is provided with a set screw 86 for fixedly connecting the wheel with the motor shaft 54. I provide the motor 12 with a boss 88 having a bore 90 for loosely receiving the shaft 92 formed integrally with the grooved wheel 94. An endless belt 96 operatively connects the wheels 84 and 94.

To the sleeve 74 I integrally connect an arm 98 which is pivotally connected with one end of an arm 100 through the medium of a shaft 102. The opposite end of the arm 100 is loosely connected with a shaft 104 attached to the wheel 94. Shaft 104 is located to one side of the shaft 92, which constitutes the axis of the wheel 94. In Fig. 1, I illustrate the shaft 104 as being provided with a shoulder 106 for abutting one face of the wheel 94, and the shaft is provided with a threaded reach 108 having threaded relation with the wheel 94 for connecting purposes. The shaft 104 terminates in a head 110 which may be slotted at 112 for the reception of a screw driver. The arm 100 is provided with a sleeve 114 which is loosely mounted on the shaft 104 but is restrained from endwise movement because of the wheel 94 and the head 110. The shaft 102 is of the same construction as the shaft 104, but its threaded end 116 is threaded into the end 118 of the arm 98.

The strainer 82 may be formed of sheet metal and is provided with a plurality of openings 120 which may be arranged in the formation of concentric circles or in spiral formation with respect to its axis. The openings 120 are provided through the entire area of the strainer, as when viewing Fig. 2, and the peripheral margin of the strainer is shaped to provide an upstanding flange 122. In Figs. 2 and 3, I illustrate a portion of the flange 122 as being shaped to provide a lip 124 arranged to deliver fruit pulp and fibers to the outlet spout 126 carried by the head 24. Fig. 5 illustrates the strainer 82 as being bent to provide an upwardly inclined lip 128 adjacent each of the perforations 120.

From the foregoing description of the various parts of the device, the operation thereof will be readily understood. The reamer 56 is rotated through the medium of the motor shaft 54. The bowl 38 is of sufficient diameter to readily accommodate the fruit from which the juice is to be extracted. The bottom 130 of the bowl 38 is provided with an opening 132 through which the fruit juices, pulp and fiber may fall upon the strainer 82. While the opening 132 is of sufficient diameter to readily accommodate the loosened material, the bottom 130 is so shaped as to drop the material upon the strainer 82 centrally thereof. While the reamer 56 is rotated in one direction, the strainer 82 is oscillated at a high speed through the medium of the arms 98 and 100. Fig. 4 illustrates the action of the arms. Wheel 94 rotates about the axis of the shaft 92, but the shaft 104 is offset to provide an eccentric connection for the arm 100. Because of this construction, the arm 98 will be oscillated as indicated by the full and dotted lines of Fig. 4, and since the arm 98 is integrally connected with the sleeve 74, such oscillatory motion will be transmitted to the collar 78, to which the strainer 82 is fixedly connected.

The lips 128 are inclined in the same direction and function to advance the fruit pulp and fibers in a spiral path about the axis of the strainer toward its periphery. The fruit pulp and fiber must advance in a continuous direction because of the lips 128. Because of the speed of the strainer, centrifugal forces will move the fruit pulp and fibers laterally of the strainer while the lips 128 advance the material along a circular path. In a construction such as that illustrated, the fruit pulp and fibers will travel throughout a number of convolutions on the strainer. During the travel of the fruit pulp and fibers, the juices are strained therefrom in an effective manner while the lips 128 provide the strainer with surface irregularities which function to break solids and juice cells into fine particles, thereby thoroughly separating the juices from the waste material. As the fruit pulp and fibers accumulate about the flange 122, the teeth 128 near the flange will continue advancing the waste material up to the zone of the lip 124. As the waste material is advanced upon the lip 124, centrifugal forces will eject the waste into the spout 126, which may drop such material into a suitable receptacle.

The fruit juices pass through the strainer and collect upon the inclined plate 44. The plate declines in the direction of the spout 46 so as to provide effective drainage. A suitable receptacle may be placed underneath the spout 46 for collecting the juices. The lower end of the collar 78 terminates in a flange 134 of larger diameter than the flange 48 so as to prevent fruit juices and waste from entering the flange. At the same time, the flange extends upwardly of the plate 44 so as to prevent juices flowing on the plate 44 from entering the opening 50.

My fruit juice extractor is designed to handle a large volume of fruit, and the operation may be continuous since the strainer 82 is self-cleaning. The reamer 56 will handle a large volume of fruit because of its high speed, but the self-cleaning action of the strainer 82 is sufficiently rapid to accomodate the waste. At the same time, the surface irregularities of the strainer resist centrifugal forces to such a degree as to cause the solids to travel a number of convolutions about the axis of the strainer, thus insuring thorough separation of the juices as well as effective reduction of the solids and juice cells. In Fig. 2, I have illustrated in full and dotted lines the range of oscillatory motion imparted to the strainer. The oscillatory motion is slight but rapid so as to cause the solids to travel a number of convolutions about the axis of the strainer while minimizing the effect of centrifugal forces in a high speed strainer. If desired, the strainer may be shaped to provide two or more concentric rib formations 136, which additionally counteract centrifugal forces for retarding the lateral shifting of the solids.

Without further elaboration, the foregoing will so fully explain my invention that others may, by applying current knowledge, readily adapt the same for use under various conditions of service.

I claim:

1. In a fruit juice extractor, the combination of a reamer and a vertical, motor driven shaft for rotating the reamer, a circular strainer having drainage perforations positioned beneath the reamer, an oscillatory drive shaft coaxially related to said motor driven shaft connected with the strainer for oscillating the latter about the axis of the motor driven shaft, drive means operatively connecting the oscillatory drive shaft with said motor driven shaft for rapidly oscillating the strainer, said drive means comprising an arm having one end fixedly related to the oscillatary drive shaft, a rotary crank element, an operating link between the other end of said arm and the crank element and an endless element for operatively connecting the crank element with said motor driven shaft, and surface irregularities on the strainer for breaking the solids and advancing the latter in the same direction in a curved path about its axis of oscillation and radially from said axis.

2. In a fruit juice extractor, the combination of a reamer and a vertical, motor driven shaft for rotating the reamer, a circular strainer having drainage perforations positioned beneath the reamer, an oscillatory drive shaft coaxially related to said motor driven shaft connected with the strainer for oscillating the latter about the axis of the motor driven shaft, drive means operatively connecting the oscillatory drive shaft with said motor driven shaft for rapidly oscillating the strainer, surface irregularities on the strainer for breaking the solids and advancing the latter in the same direction in a curved path about its axis of oscillation and radially from said axis, a spout, and a peripheral flange carried by the strainer provided with a gate for delivering solids to the spout.

3. In a fruit juice extractor, the combination of a reamer and a vertical, motor driven shaft for rotating the reamer, a circular strainer having drainage perforations positioned beneath the reamer, an oscillatory drive shaft coaxially related to said motor driven shaft connected with the strainer for oscillating the latter about the axis of the motor driven shaft, drive means operatively connecting the oscillatory drive shaft with said motor driven shaft for rapidly oscillating the strainer, surface irregularities on the strainer for breaking the solids and advancing the latter in the same direction in a curved path about its axis of oscillation and radially from said axis, a spout, a peripheral flange carried by the strainer provided with a gate for delivering solids to the spout, a second spout, and a fruit juice collector located underneath the strainer for delivering fruit juices to the second spout.

4. In a fruit juice extractor, the combination of a reamer and a vertical, motor driven shaft for rotating the reamer, a circular strainer having drainage perforations positioned beneath the reamer, an oscillatory drive shaft coaxially related to said motor driven shaft connected with the strainer for oscillating the latter about the axis of the motor driven shaft, drive means operatively connecting the oscillatory drive shaft with said motor driven shaft for rapidly oscillating the strainer, said drive means comprising an arm having one end fixedly related to the oscillatory drive shaft, a rotary crank element, an operating link between the other end of said arm and the crank element and an endless element for operatively connecting the crank element with said motor driven shaft, surface irregularities on the strainer for breaking the solids and advancing the latter in the same direction in a curved path about its axis of oscillation and radially from said axis, a spout, and a peripheral flange carried by said strainer provided with a gate for delivering solids to the spout.

5. In a fruit juice extractor, the combination of a reamer and a vertical, motor driven shaft for rotating the reamer, a circular strainer having drainage perforations positioned beneath the reamer, an oscillatory drive shaft coaxially related to said motor driven shaft connected with the strainer for oscillating the latter about the axis of the motor driven shaft, drive means operatively connecting the oscillatory drive shaft with said motor driven shaft for rapidly oscillating the strainer, said drive means comprising an arm having one end fixedly related to the oscillatory drive shaft, a rotary crank element, an operating link between the other end of said arm and the crank element and an endless element for operatively connecting the crank element with said motor driven shaft, surface irregularities on the strainer for breaking the solids and advancing the latter in the same direction in a curved path about its axis of oscillation and radially from said axis, a spout, a peripheral flange carried by said strainer provided with a gate for delivering solids to the spout, a second spout, and a juice collector located underneath said strainer for delivering fruit juices to said second spout.

HERBERT FROMM.